(12) United States Patent
Koo et al.

(10) Patent No.: US 8,978,745 B2
(45) Date of Patent: Mar. 17, 2015

(54) EXHAUST GAS HEAT RECOVERY HEAT EXCHANGER HAVING A LOBED TUBE COIL

(75) Inventors: James J. Koo, E. Amherst, NY (US); Mark James Zima, Clarence Center, NY (US); James Alan Bright, Gasport, NY (US); James A. Acre, Barker, NY (US)

(73) Assignee: Delphi Technologies, Inc., Troy, MI (US)

( * ) Notice: Subject to any disclaimer, the term of this patent is extended or adjusted under 35 U.S.C. 154(b) by 704 days.

(21) Appl. No.: 13/289,641

(22) Filed: Nov. 4, 2011

(65) Prior Publication Data
US 2013/0112371 A1    May 9, 2013

(51) Int. Cl.
| F28D 7/02 | (2006.01) |
| F28F 27/02 | (2006.01) |
| F28D 21/00 | (2006.01) |
| F28F 1/06 | (2006.01) |
| F02M 25/07 | (2006.01) |
| F28F 13/12 | (2006.01) |

(52) U.S. Cl.
CPC ............... *F28D 7/024* (2013.01); *F28F 27/02* (2013.01); *F28D 21/0003* (2013.01); *F28F 1/06* (2013.01); *F02M 25/0737* (2013.01); *Y02T 10/121* (2013.01); *Y02T 10/16* (2013.01)
USPC .......................... 165/163; 165/109.1; 165/177

(58) Field of Classification Search
CPC ........... F28D 7/04; F28D 7/024; F28D 7/028; F28D 21/0003; F28D 7/106; F01N 3/043; F01N 5/02; F01N 2410/00; F01N 2240/36; F28F 1/36; F02M 25/0737; Y02T 10/16; Y02T 10/121
USPC ......... 165/156, 163, 109.1, 103, 177; 60/320; 123/568.12
See application file for complete search history.

(56) References Cited

U.S. PATENT DOCUMENTS

| 3,875,759 | A | * | 4/1975 | Malcosky et al. ................ 62/394 |
| 4,154,297 | A | * | 5/1979 | Austin ............................. 166/61 |
| 4,371,027 | A | * | 2/1983 | Jacobsen ........................ 165/297 |
| 4,557,323 | A | * | 12/1985 | Hardy et al. ................... 165/163 |
| 5,131,351 | A | * | 7/1992 | Farina ........................ 122/250 R |
| 5,228,505 | A | * | 7/1993 | Dempsey ....................... 165/140 |
| 5,617,737 | A | * | 4/1997 | Christensen et al. ........... 62/487 |
| 5,799,632 | A | | 9/1998 | Bennett |

(Continued)

OTHER PUBLICATIONS

Pending U.S. Appl. No. 12/217,531, filed Jul. 7, 2008.

*Primary Examiner* — Tho V Duong
(74) *Attorney, Agent, or Firm* — James M. Chan

(57) ABSTRACT

An exhaust gas heat recovery (EGHR) heat exchanger, for recovering waste heat from the hot exhaust gases of an internal combustion engine, having a housing and a cylindrical body disposed within the housing. The cylindrical body defines a central passageway and together with the housing defines an annular passageway for the flow of hot exhaust gases. A bypass means is disposed within the central passageway and adapted to selectively by-pass at least a portion of the exhaust gas from the central passageway to the annular passageway. The EGHR heat exchanger also includes at least one fluid tube extending along a tube axis and having at least one lobe extending the length of the tube thereby defining a lobed tube. The lobed tube is twisted about the tube axis forming a twisted lobed tube which is then coiled about the longitudinal axis within the annular exhaust gas passageway.

5 Claims, 4 Drawing Sheets

(56) References Cited

U.S. PATENT DOCUMENTS

| | | | |
|---|---|---|---|
| 6,151,891 A | 11/2000 | Bennett | |
| 6,330,910 B1 | 12/2001 | Bennett | |
| 7,063,134 B2 * | 6/2006 | Poole et al. | 165/163 |
| 2005/0133202 A1 * | 6/2005 | Jorgensen et al. | 165/103 |

* cited by examiner

U.S. 8,978,745 B2

EXHAUST GAS HEAT RECOVERY HEAT EXCHANGER HAVING A LOBED TUBE COIL

TECHNICAL FIELD OF INVENTION

The present disclosure relates to a heat exchanger for a motor vehicle; more particularly, to a heat exchanger for recovering heat from the exhaust of an internal combustion engine of the motor vehicle.

BACKGROUND OF INVENTION

A heater core, which is located inside a heating, ventilating, and air conditioning (HVAC) module of a motor vehicle supplies thermal energy to the passenger compartment for comfort heating. The heater core is typically a liquid-to-air heat exchanger. A heat transfer liquid, such as a glycol based coolant, conveys waste heat from an internal combustion engine to the heater core where the thermal energy from the heat transfer liquid is transferred to the ambient air flowing through the heater core to the passenger compartment. With the advent of greater efficiency internal combustion engines and hybrid vehicles having smaller internal combustion engines, the amount of thermal energy available to provide comfort to passengers in the passenger compartment may not be adequate.

Exhaust gas heat recovery exchangers (EGHR) are known to be used to capture waste heat from the exhaust gas of an internal combustion engine to supplement the heat provided by the heater core to heat the ambient air directed to the passenger compartment. Aside from providing supplementary heat to the passenger compartment, the heat energy in the exhaust gas can be used to heat other fluids within the vehicle, such as the windshield wiper fluid, motor oil, and transmission fluid.

More efficient and smaller internal combustion engines produce less waste heat in the exhaust gas for the EGHR heat exchanger to recover. Accordingly, there is a need to extract as much waste heat as possible from the exhaust gases of efficient and smaller internal combustion engines to supplement comfort heating and to heat the vehicle fluids as mentioned above.

SUMMARY OF THE INVENTION

The invention relates to an exhaust gas heat recovery (EGHR) heat exchanger having a housing disposed along a longitudinal axis, wherein the housing includes a first end cap, a second end cap spaced from the first end cap, and an interior surface therebetween defining a cavity. A cylindrical body is disposed within the cavity defining an annular exhaust gas passageway and a central exhaust gas passageway. At least one fluid tube is disposed within the annular exhaust gas passageway and coiled about the longitudinal axis defining a plurality of coiled tubes having varying coil diameters. A bypass control valve may be disposed in the central passageway to bypass hot exhaust gas flow from the central passageway to the annular passageway to control heat transfer to the fluid flowing through the fluid tube.

The fluid tube includes a cross-sectional area having at least one protrusion extending radially from the local tube axis. The protrusion may be a curved projection such as a lobe and extends substantially along the length of the tube, thereby defining a lobed fluid tube. The lobed fluid tube is twisted about the local tube axis defining a twisted lobe fluid tube having a spiraled fluid flow passageway and exterior spiraled grooves. Once coiled in the annular passageway about the longitudinal axis, the exterior spiraled groove is oriented in a direction that is substantially transverse to the direction of hot exhaust gas flow in the annular passageway.

The twisted lobed fluid tube enhances the turbulence of the exhaust gas side and fluid side, and increases the heat transfer rate (coefficient) between the exhaust gas and fluid sides. For the same flow area, a twisted lobed fluid tube provides a smaller hydraulic diameter and more heat transfer surface than a smooth round tube, thereby improving the heat transfer coefficient.

BRIEF DESCRIPTION OF DRAWINGS

This invention will be further described with reference to the accompanying drawings in which:

FIG. 3A shows an end view of a fluid tube having a three (3) lobe cross-sectional area.

FIG. 3B shows an end view of an alternative embodiment of a fluid tube having a one (1) lobe cross section area.

DETAILED DESCRIPTION OF INVENTION

Shown in FIGS. 1 through 5, wherein like numerals indicate corresponding parts throughout the several views, is an embodiment of an exhaust gas heat recovery (EGHR) heat exchanger 10 of the present invention. The EGHR heat exchanger 10 may be used for recovering waste heat from the exhaust gas of an internal combustion engine of a motor vehicle to provide supplementary heat to the passenger compartment as well as to heat automotive fluids, such as the windshield wiper fluid, engine oil, and transmission fluids. For hybrid vehicles, the waste heat from the internal combustion engine may also be recovered to provide heat to the battery compartment to extend the range of the battery life in cold operating conditions.

Figure 1:
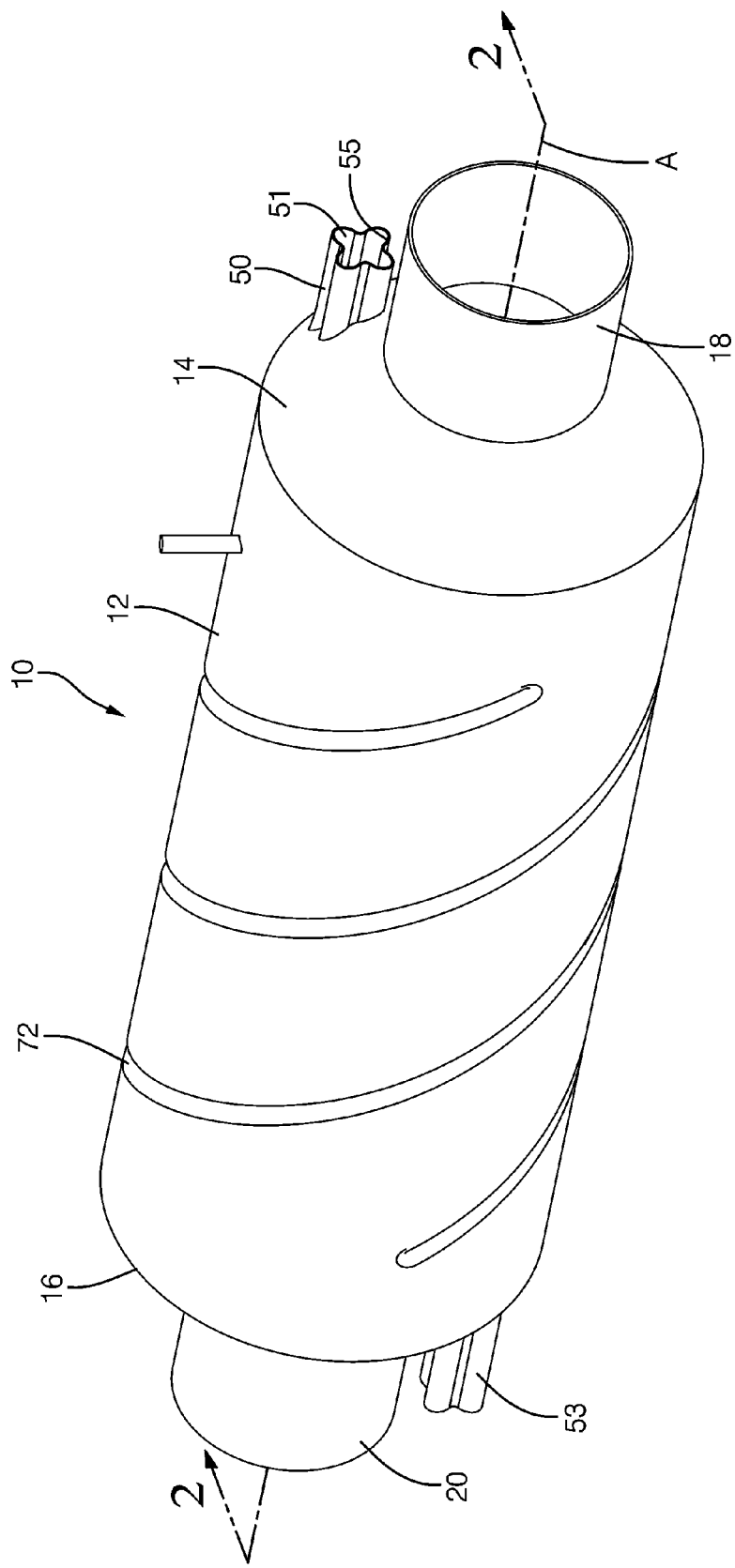
FIG. 1 shows a perspective view of an embodiment of the present invention of an exhaust gas heat recovery (EGHR) heat exchanger extending along a longitudinal axis-A.

Shown in FIG. 1 is a perspective view of the EGHR heat exchanger 10. The EGHR heat exchanger 10 includes an elongated housing 12 extending along a longitudinal axis-A. The elongated housing 12 includes a first end cap 14 and a second end cap 16 axially spaced from the first end cap 14. Extending from the first end cap 14 is an inlet coupling 18 configured to hydraulically connect to the exhaust system of a motor vehicle to receive the hot exhaust gas from an internal combustion engine. Extending from the second end cap 16 is an outlet coupling 20 configured to hydraulically connect to the downstream portion of the exhaust system of the motor vehicle. A fluid tube 50 having a tube inlet 51 and tube outlet 53 is partially disposed within the elongated housing 12. The fluid tube 50 includes an internal tube surface 55 defining a passageway for the flow of automotive fluids. The fluid tube 50 may be formed of any heat conductive material such as copper, brass, or aluminum that is amendable to brazing. As an alternative, the EGHR heat exchanger 10, including the fluid tube 50, may be formed of a stainless steel and welded.

Figure 2:
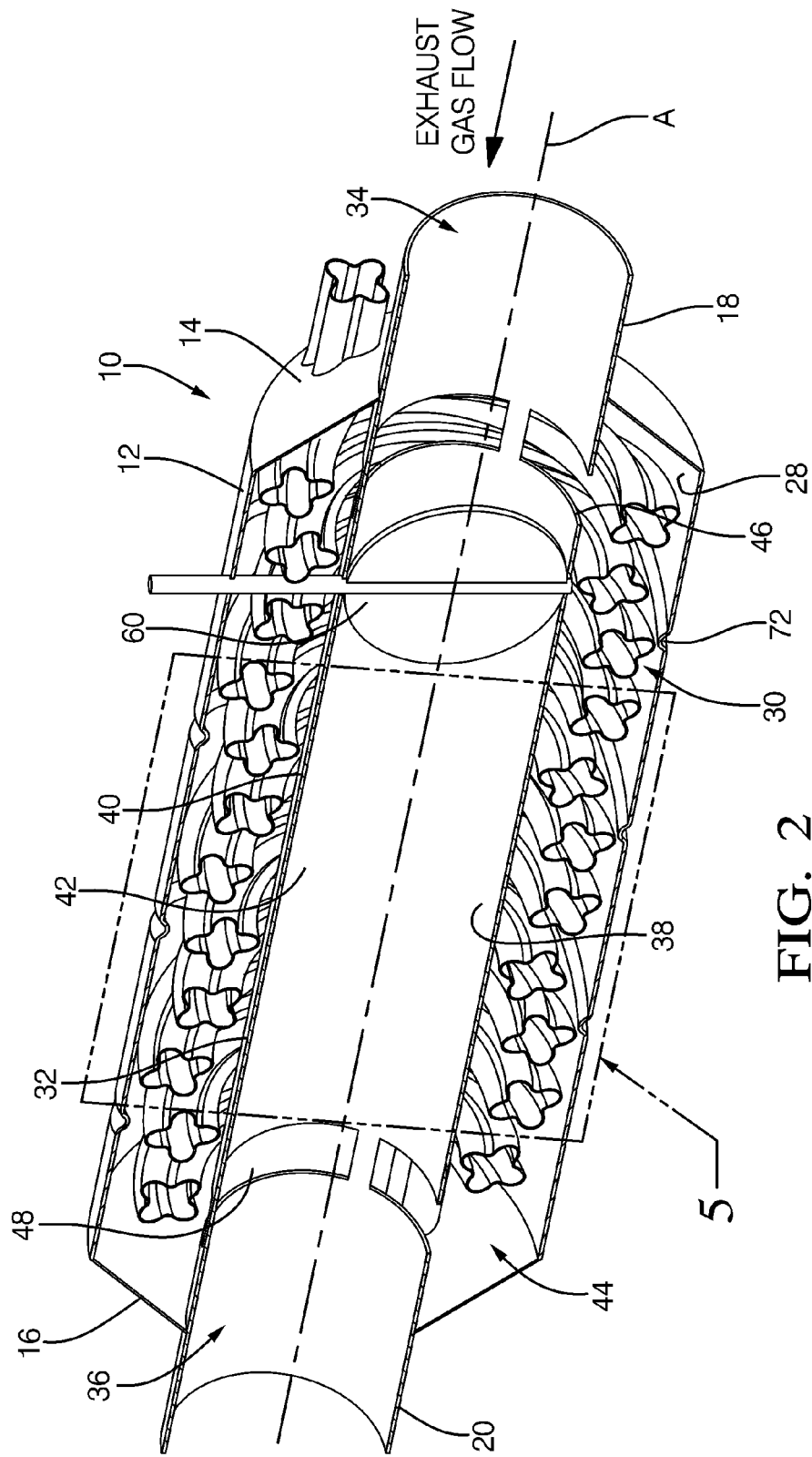
FIG. 2 shows a cut-away view along section line 2-2 of the EGHR heat exchanger shown in FIG. 1.

Shown in FIG. 2 is a perspective cut-away view of the EGHR heat exchanger 10 of FIG. 1. The elongated housing 12 includes an interior surface 28 defining an interior cavity 30. Disposed within the interior cavity 30 along the longitudinal axis-A is a substantially cylindrical body 32 having a cylindrical body first end 34 extending through the first end cap 14 of the elongated housing 12 to define the inlet coupling 18. Similarly, the cylindrical body includes a second end 36 extending through the second end cap 16 of the elongated housing 12 to define the outlet coupling 20. The cylindrical body 32 also includes a cylindrical body interior surface 38 and a cylindrical body exterior surface 40. The cylindrical body interior surface 38 defines a central exhaust gas passageway 42. The cylindrical body exterior surface 40 is spaced from and cooperates with the interior surface 28 of the elongated housing 12 to define an annular exhaust gas passageway 44.

A portion of the cylindrical body 32 defines a first opening 46 adjacent to the cylindrical body first end 34 and a second opening 48 adjacent to the cylindrical body second end 36, in which both first and second openings 46, 48 are located within the interior cavity 30 of the elongated housing 12. Disposed within the central exhaust gas passageway 42 between the first opening 46 and second opening 48 is a by-pass valve 60, such as that of a butterfly type valve known for its simple design or a swinging-arm type valve known for its lower pressure drop as compared to other types of by-pass valves. The by-pass valve 60 may selectively by-pass a portion or all of the hot exhaust gas flow from the central exhaust gas passageway 42 to the annular exhaust gas passageway 44.

As the by-pass valve 60 restricts or closes the flow of hot exhaust gas through the central exhaust gas passageway 42, the hot exhaust gas finds the path of least restriction by exiting the first opening 46 and flowing through the annular exhaust gas passageway 44 toward the second opening 48. The exhaust gas then re-enters the central exhaust gas passageway 42 through the second opening 48 and exits the outlet coupling 20. The by-pass valve 60 may be provided through the center of the heat exchanger assembly to minimize the pressure drop of the fluid flow during by-pass operations. The by-pass valve 60 may also be used to control the temperature of the fluid exiting the fluid tube outlet 53 by controlling the amount of hot exhaust gas that is by-passed through the annular exhaust gas passageway 44.

Figure 3:
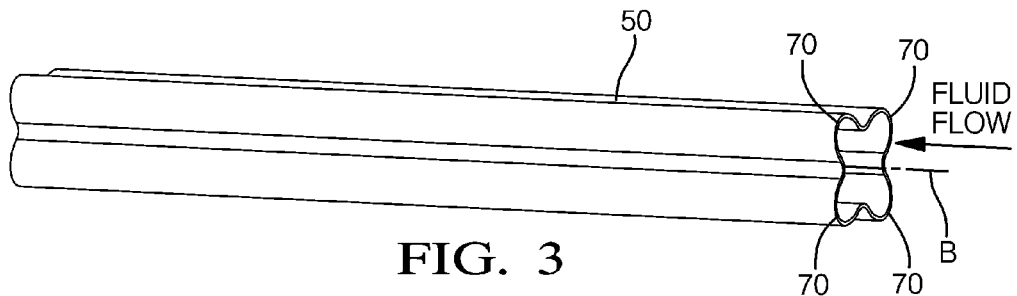
FIG. 3 shows a perspective view of a fluid tube having a four (4) lobe cross sectional area extending along a local tube axis-B.
Figure 3:
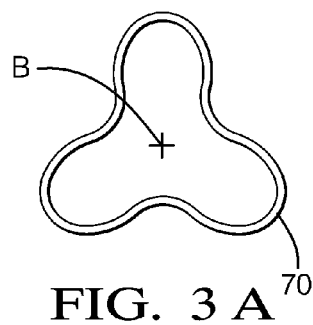
Figure 3:
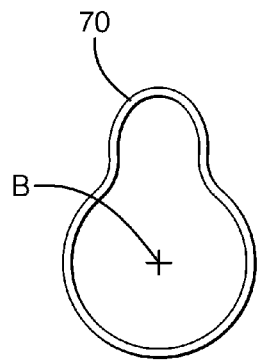

Shown in FIG. 3 is a fluid tube 50 extending along a local tube axis-B. The fluid tube 50 has a cross-sectional profile that is perpendicular to the direction of fluid flow. The cross-sectional profile includes four (4) protrusions 70 extending radially from the local tube axis-B. Each of the protrusions 70 may be in the form of a curved projection 70 such as a lobe 70 that extends the length of the fluid tube 50. With respect to the perspective view of the cross-sectional profile shown in FIG. 3, the four (4) lobes 70 shown are substantially equally distributed about the local tube axis-B. FIG. 3A shows an example of a cross-sectional profile of an alternative embodiment of the fluid tube 50 having three (3) lobes 70 extending radially from the local tube axis-B. FIG. 3B shows an example of a cross-sectional profile of another alternative embodiment of the fluid tube 50 having only one (1) lobe 70 extending radially from the local tube axis-B. The lobes 70 of FIG. 3A and FIG. 3B extend the length of the fluid tube 50.

Figure 4:
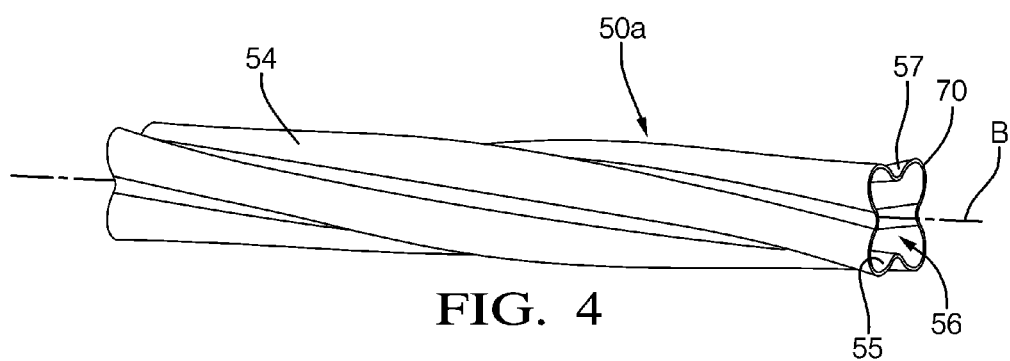
FIG. 4 shows the fluid tube of FIG. 3 twisted along the local tube axis-B.

Shown in FIG. 4 is a perspective view of the fluid tube 50 of FIG. 3 twisted about the local tube axis-B forming a twisted lobed tube 50a. The twisted lobed tube 50a includes an interior tube surface 55 that defines a spiraled fluid flow passageway 56. The spiraled fluid flow passageway 56 aids in the mixing of the automotive fluid flowing within passageway 56 by swirling the fluid as it flow through the passageway 56. The portion of the exterior surface 57 of the twisted lobed tube 50a between the lobes 70 defines a spiraled groove 54.

Figure 5:
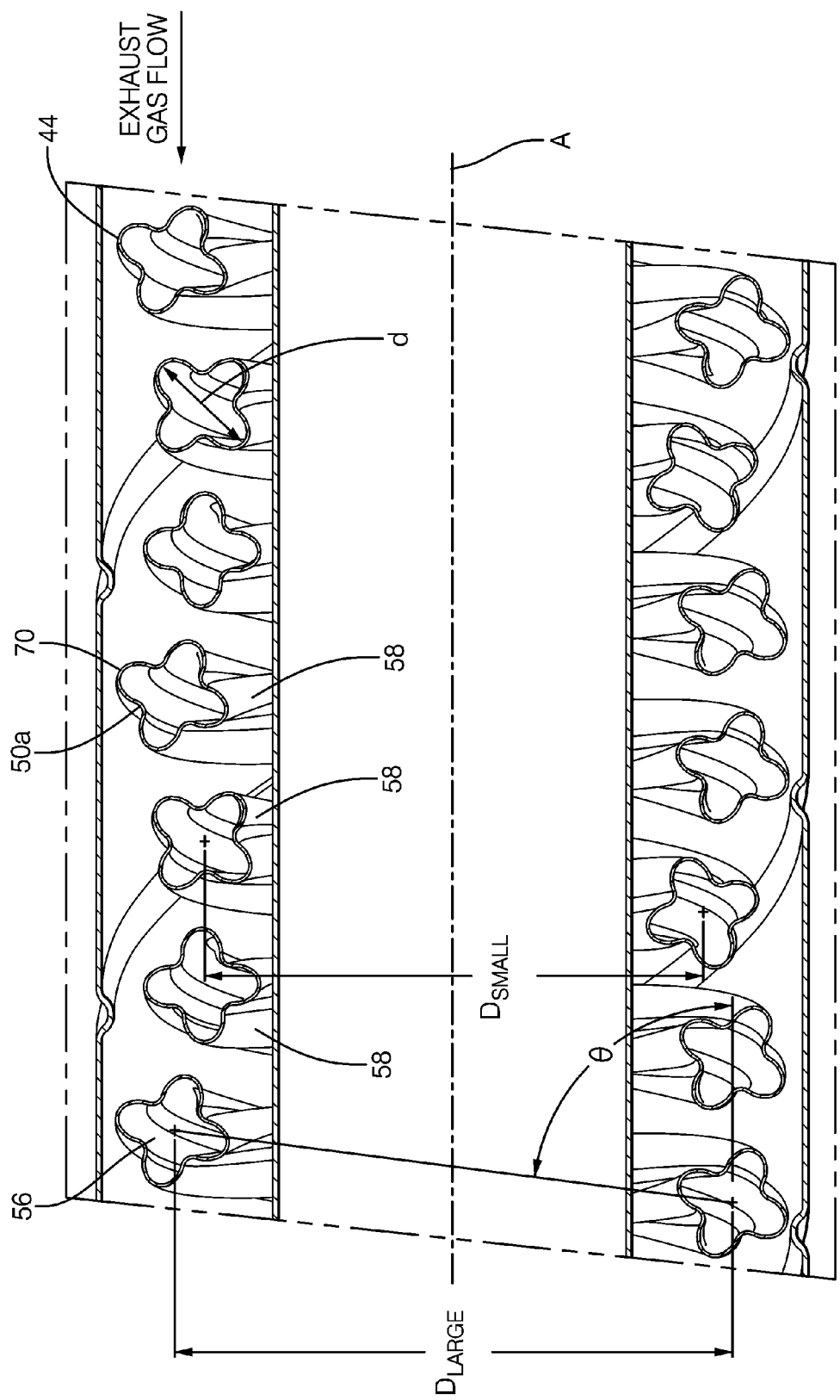
FIG. 5 shows the detailed sectional view 5 of the EGHR heat exchanger of FIG. 2.

Shown in FIG. 5 is detailed view 5 of FIG. 2 of the EGHR heat exchanger 10 showing the twisted lobed tube 50a coiled about the longitudinal axis-A within the annular exhaust gas passageway 44. The coiling of the twisted lobed tube 50a provides a plurality of adjacent coils 58, thereby increasing the surface area available for heat transfer between the hot exhaust gas passing through the annular exhaust gas passageway 44 and the automotive fluid flowing in the fluid flow passageway 56 of the fluid tube 50. The lobes 70 and spiraled grooves 54 of the coils 58 are oriented in a direction that is substantially perpendicular to the direction of flow of the hot exhaust gas and interrupts the flow of the hot exhaust gas as it passes over the twisted lobed tube 50a, thereby creating turbulent flow of exhaust gas in the annular exhaust gas passageway 44.

Referring to FIG. 5, the twisted lobed tube 58a is coiled about the longitudinal axis-A providing a plurality of coils 58 oriented at a predetermined angle θ relative to the longitudinal axis-A. The coils 58 have varying diameters from a larger diameter $D_{large}$ to a smaller diameter $D_{small}$. The varying diameter coils 58 create a torturous path for the exhaust gas flowing through the annular passageway. The flow of exhaust gas weaves in and out between the coils 58 instead of only flowing over the top or bottom of the coils 58. The weaving of the gas increases turbulence which in turn increases the heat transferred and the energy recovered from the exhaust stream. Increasing the diameter $D_{large}$, relative to the diameter $D_{small}$ of the coils 58 between ten (10) to seventy (70) percent of the fluid tube 50 diameter d decreases the chance of gas being trapped in eddies between adjacent coils 58. As an alternative embodiment, the EGHR heat exchanger 10 may have one or more internal twisted lobed tubes 50a helically coiled about the longitudinal axis-A defining multiple spiraled passageways 56.

The interior surface of the elongated housing 12 may include a spiraled rib 72 which projects toward the longitudinal axis-A. The spiraled rib 72 assists in the swirling of the exhaust gas as it flows through the annular exhaust gas passageway 44. The spiraled ribs 72 may be formed by deforming a portion of the interior surface 28 of the elongated housing 12 toward the interior cavity 30.

It is preferable that the twisted fluid tube be formed of a heat conductive metal such as a copper or aluminum alloy that is amenable to brazing, or stainless steel amenable to welding. The interior cylindrical body 32 and elongated housing 12 may also be formed of a material that is amenable to brazing, or stainless steel amenable to welding. The heat exchanger may be manufactured by assembling the individual elements of the EGHR heat exchanger and then braze or weld the elements together as a single integral assembly.

The coiled twisted lobed tube 50a increases the heat transfer rate (coefficient) between the hot exhaust gas side and automotive fluid side. For the same flow area, the coiled twisted lobed tubes 50a yield a smaller hydraulic diameter and provide more heat transfer surface than conventional smooth round tubes, thereby improving the heat transfer coefficient.

While this invention has been described in terms of the preferred embodiments thereof, it is not intended to be so limited, but rather only to the extent set forth in the claims that follow. The disclosure is directed toward a exhaust gas heat recovery (EGHR) heat exchangers, but those with ordinary skill in the art would recognized that the disclosure is also applicable to EGR coolers.

Having described the invention, it is claimed:

1. An exhaust gas heat recovery (EGHR) heat exchanger for an internal combustion engine, comprising:
   a housing disposed along a longitudinal axis, wherein said housing includes a first end cap, a second end cap axially spaced from said first end cap, and an interior surface therebetween defining a cavity;
   a cylindrical body disposed within said cavity and includes a first end extending through said first end cap defining an exhaust gas inlet, a second end extending through said second end cap defining an exhaust gas outlet, an interior surface defining a central exhaust gas passageway, and an exterior surface cooperating with said interior surface of housing to define an annular exhaust gas passageway;
   means for selectively by-passing a portion of the exhaust gas from the central exhaust gas passageway to the annular passageway; and
   at least one fluid tube disposed within said annular exhaust gas passageway and coiled about the longitudinal axis defining a plurality of coils;
   wherein said fluid tube includes a local tube axis and a cross sectional profile substantially perpendicular to said local tube axis; and
   wherein said cross sectional profile includes at least one protrusion extending radially from said local tube axis,
   wherein said at least one protrusion defines a curved projection,
   wherein said curved projection defines a lobe extending substantially the length of said fluid tube,
   wherein said fluid tube is twisted about said local tube axis thereby defining a twisted lobed fluid tube,
   wherein said twisted lobed fluid tube includes a spiraled groove,
   wherein said spiraled groove is oriented substantially transverse to the flow of hot exhaust gas flowing through said annular exhaust gas passageway,
   wherein said at least one of said plurality of coils includes a diameter $D_{large}$ and an adjacent coil includes a diameter $D_{small}$, and said fluid tube includes a diameter d, wherein said $D_{large}$ is greater than $D_{small}$ by 10 to 70 percent of d.

2. The EGHR heat exchanger of claim 1, wherein said interior surface of said housing defines a rib spiraled about the longitudinal axis.

3. The EGHR heat exchanger of claim 2, wherein said twisted lobed tube includes four (4) lobes substantially equally distributed about said local tube axis.

4. An exhaust gas heat recovery (EGHR) heat exchanger for an internal combustion engine, comprising:
   a housing disposed along a longitudinal axis, wherein said housing includes a first end cap, a second end cap axially spaced from said first end cap, and an interior surface therebetween defining a cavity;
   a cylindrical body longitudinally disposed within said cavity and includes a first end extending through said first end cap defining an exhaust gas inlet, an opposite second end extending through said second end cap defining an exhaust gas outlet, an exterior surface cooperating with said interior surface of housing to define an annular exhaust gas passageway, and an interior surface defining a central exhaust gas passageway; and
   at least one fluid tube disposed within said annular exhaust gas passageway and coiled about the longitudinal axis defining a coiled tube;
   wherein said fluid tube includes a local tube axis and a cross-sectional profile having a plurality of lobes extending radially from said local tube axis,
   wherein said fluid is twisted about said local tube axis defining a twisted lobed tube,
   wherein said twisted lobed tube is coiled about said longitudinal axis defining a plurality of coils having varying diameters about said longitudinal axis,
   wherein said twisted lobed tube includes 4 lobes substantially equally distributed about said local tube axis,
   wherein said at least one of said plurality of coils includes a diameter $D_{large}$ and an adjacent coil includes a diameter $D_{small}$, and said fluid tube includes a diameter d, wherein said $D_{large}$ is greater than $D_{small}$ by 10 to 70 percent of d.

5. The EGHR heat exchanger of claim 4, wherein said interior surface of said housing defines a rib spiraled about axis A.

* * * * *